US011021072B2

(12) United States Patent
Yamanaka

(10) Patent No.: US 11,021,072 B2
(45) Date of Patent: Jun. 1, 2021

(54) VEHICLE HEAT MANAGEMENT CONTROL DEVICE AND RECORDING MEDIUM STORING HEAT MANAGEMENT CONTROL PROGRAM

(71) Applicant: KABUSHIKI KAISHA TOYOTA CHUO KENKYUSHO, Nagakute (JP)

(72) Inventor: Gentaro Yamanaka, Nagakute (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 204 days.

(21) Appl. No.: 15/854,907

(22) Filed: Dec. 27, 2017

(65) Prior Publication Data

US 2018/0229620 A1    Aug. 16, 2018

(30) Foreign Application Priority Data

Feb. 10, 2017    (JP) .............................. JP2017-023130

(51) Int. Cl.
*B60L 11/18*    (2006.01)
*B60L 53/14*    (2019.01)
(Continued)

(52) U.S. Cl.
CPC ................ *B60L 53/14* (2019.02); *B60K 6/48* (2013.01); *B60K 11/00* (2013.01); *B60L 1/02* (2013.01);
(Continued)

(58) Field of Classification Search
CPC ........ B60L 53/14; B60L 58/27; B60L 53/302; B60L 58/26; B60L 1/02; B60L 2240/36;
(Continued)

(56) References Cited

U.S. PATENT DOCUMENTS 3,888,303 A * 6/1975 Skala ...................... A47J 27/17
                                                      165/300
4,021,677 A * 5/1977 Rosen ..................... B60L 58/14
                                                       290/40 R
(Continued)

FOREIGN PATENT DOCUMENTS

JP    2009-073430 A    4/2009
JP    2009-257239 A    11/2009
(Continued)

OTHER PUBLICATIONS

May 28, 2019 Office Action issued in Japanese Patent Application No. 2017-023130.

*Primary Examiner* — Paul Alvare
*Assistant Examiner* — Kirstin U Oswald
(74) *Attorney, Agent, or Firm* — Oliff PLC

(57) ABSTRACT

A heat management control device for a vehicle that includes an electric motor and a power supply section that includes a storage battery and that supplies electrical power to the electric motor. The heat management control device includes a charging device that charges the storage battery through a connection to an external power source, a heat exchanger that performs heat exchange of heat generated by the charging device during charging with fluid flowing in a specific transport path. The heat management control device includes a heat storage section that uses a chemical reaction partway along the specific transport path in order to recover heat from the fluid and that stores the recovered heat, and a fluid supply controller that, from immediately after a vehicle is started, releases heat stored by the heat storage section to the fluid, and selectively supplies the fluid to a predetermined plurality of warm-up targets.

6 Claims, 12 Drawing Sheets

(51) Int. Cl.

| | | |
|---|---|---|
| *B60K 11/00* | (2006.01) | |
| *B60K 6/48* | (2007.10) | |
| *B60W 30/194* | (2012.01) | |
| *B60W 10/30* | (2006.01) | |
| *B60W 10/26* | (2006.01) | |
| *B60L 58/27* | (2019.01) | |
| *B60L 53/302* | (2019.01) | |
| *B60L 58/26* | (2019.01) | |
| *B60L 1/02* | (2006.01) | |
| *B60W 20/00* | (2016.01) | |
| *B60W 20/15* | (2016.01) | |

(52) U.S. Cl.
CPC ......... *B60L 11/1875* (2013.01); *B60L 53/302* (2019.02); *B60L 58/26* (2019.02); *B60L 58/27* (2019.02); *B60W 10/26* (2013.01); *B60W 10/30* (2013.01); *B60W 30/194* (2013.01); *B60L 2210/42* (2013.01); *B60L 2240/36* (2013.01); *B60W 20/00* (2013.01); *B60W 20/15* (2016.01); *B60W 2510/0676* (2013.01); *B60W 2510/107* (2013.01); *B60W 2510/246* (2013.01); *B60W 2540/10* (2013.01); *Y02T 10/62* (2013.01); *Y02T 10/70* (2013.01); *Y02T 10/7072* (2013.01); *Y10S 903/904* (2013.01)

(58) Field of Classification Search
CPC ....... B60L 2210/42; B60K 11/00; B60K 6/48; B60W 30/194; B60W 10/30; B60W 10/26; B60W 2510/0676; B60W 2510/246; B60W 20/15; B60W 2510/107; B60W 2540/10; B60W 20/00; Y02T 10/62; Y02T 10/70; Y02T 10/7072; Y02T 10/6226; Y02T 10/7005; Y02T 10/7077; Y02T 90/14; Y02T 90/12; Y10S 903/904
USPC .......................................................... 62/159
See application file for complete search history.

(56) References Cited

U.S. PATENT DOCUMENTS

| | | | | |
|---|---|---|---|---|
| 4,642,994 A * | 2/1987 | Barclay | ............... | F25B 21/00 62/3.3 |
| 5,091,361 A * | 2/1992 | Hed | ............... | H01L 39/143 505/163 |
| 5,251,588 A * | 10/1993 | Tsujii | ............... | B60K 6/54 123/142.5 R |
| 5,255,733 A * | 10/1993 | King | ............... | B60L 50/61 165/299 |
| 5,291,960 A * | 3/1994 | Brandenburg | ..... | B60H 1/00492 180/65.27 |
| 5,327,987 A * | 7/1994 | Abdelmalek | ............ | B60K 6/52 180/65.25 |
| 5,345,761 A * | 9/1994 | King | ............... | F01N 3/2814 60/274 |
| 5,366,151 A * | 11/1994 | King | ............... | F02M 25/089 237/2 A |
| 5,492,190 A * | 2/1996 | Yoshida | ............... | B60W 10/06 180/65.245 |
| 5,553,662 A * | 9/1996 | Longardner | ....... | B60H 1/00492 165/202 |
| 5,556,028 A * | 9/1996 | Khelifa | ............... | B60H 3/024 237/12.3 A |
| 5,617,913 A * | 4/1997 | DeGregoria | ...... | A61M 16/1045 128/201.13 |
| 5,701,891 A * | 12/1997 | Groenke | ............ | A61M 16/1045 128/201.13 |
| 5,727,616 A * | 3/1998 | Groenke | ............... | A62B 9/003 165/4 |
| 5,785,137 A * | 7/1998 | Reuyl | ............... | B60W 10/08 180/65.245 |
| 5,836,151 A * | 11/1998 | Atanasyan | ............... | F02D 41/06 60/274 |
| 6,018,694 A * | 1/2000 | Egami | ............... | B60W 10/18 701/102 |
| 6,059,016 A * | 5/2000 | Rafalovich | ........ | B60H 1/00492 165/41 |
| 6,070,650 A * | 6/2000 | Inoue | ............... | B60H 1/3208 165/42 |
| 6,078,024 A * | 6/2000 | Inoue | ............... | B60H 1/2218 165/299 |
| 6,170,587 B1 * | 1/2001 | Bullock | ............ | B60W 30/18127 180/69.6 |
| 6,178,760 B1 * | 1/2001 | Tanaka | ............... | B60L 1/04 62/154 |
| 6,202,782 B1 * | 3/2001 | Hatanaka | ............... | B60L 50/16 180/301 |
| 6,292,741 B1 * | 9/2001 | Bitzer | ............... | B60W 10/04 701/103 |
| 6,327,852 B1 * | 12/2001 | Hirose | ............... | B60W 10/06 60/297 |
| 6,330,909 B1 * | 12/2001 | Takahashi | ............... | F25B 41/31 165/202 |
| 6,464,027 B1 * | 10/2002 | Dage | ............... | B60H 1/00492 180/65.22 |
| 6,718,758 B1 * | 4/2004 | Suzuki | ............... | B60W 10/26 60/300 |
| 7,266,967 B2 * | 9/2007 | Inoue | ............... | B60H 1/3201 62/238.3 |
| 7,487,852 B2 * | 2/2009 | Leone | ............... | F02D 41/0275 180/65.28 |
| 7,897,898 B2 * | 3/2011 | Muller | ............... | F25B 21/00 219/672 |
| 8,061,132 B2 * | 11/2011 | Fong | ............... | F15B 15/20 60/417 |
| 8,997,503 B2 * | 4/2015 | Morisita | ............ | B60H 1/00392 62/79 |
| 9,389,007 B1 * | 7/2016 | McKay | ............... | F25B 27/00 |
| 9,587,546 B2 * | 3/2017 | Hussain | ............... | F01N 5/02 |
| 2001/0010261 A1 * | 8/2001 | Oomura | ............... | B60K 6/48 165/42 |
| 2002/0055810 A1 * | 5/2002 | Nakasako | ............... | B60K 6/48 701/22 |
| 2002/0161495 A1 * | 10/2002 | Yamaki | ............... | G07C 5/008 701/33.8 |
| 2002/0162693 A1 * | 11/2002 | Mizuno | ............ | H01M 8/04156 180/65.1 |
| 2003/0159455 A1 * | 8/2003 | Aikawa | ............... | F25B 5/04 62/225 |
| 2003/0167925 A1 * | 9/2003 | Aikawa | ............... | B60H 1/00492 96/126 |
| 2004/0147366 A1 * | 7/2004 | Aoki | ............... | B60K 28/165 477/6 |
| 2004/0182373 A1 * | 9/2004 | Li | ............... | F02M 26/47 123/568.12 |
| 2005/0188717 A1 * | 9/2005 | Aikawa | ............... | F25D 16/00 62/434 |
| 2005/0199440 A1 * | 9/2005 | Keefe | ............... | F16J 15/064 181/284 |
| 2005/0284676 A1 * | 12/2005 | King | ............... | B60W 10/08 180/65.22 |
| 2006/0063046 A1 * | 3/2006 | Hu | ............... | B60L 58/30 429/414 |
| 2006/0259219 A1 * | 11/2006 | Wakiyama | ......... | B60H 1/00764 701/36 |
| 2006/0280977 A1 * | 12/2006 | Sakajo | ............... | H01M 8/04589 429/429 |
| 2007/0255485 A1 * | 11/2007 | Kaita | ............... | F02M 25/0827 701/102 |
| 2007/0272116 A1 * | 11/2007 | Bartley | ............... | B60T 13/662 105/35 |
| 2007/0272174 A1 * | 11/2007 | Szalony | ............... | F01P 11/20 123/41.14 |
| 2008/0093143 A1 * | 4/2008 | Harrison | ............... | B60H 1/3208 180/165 |
| 2008/0174174 A1 * | 7/2008 | Burns | ............... | B60W 20/13 303/152 |

(56) References Cited

U.S. PATENT DOCUMENTS

| | | | | |
|---|---|---|---|---|
| 2008/0275600 A1* | 11/2008 | Rask | B60W 10/06 | 701/22 |
| 2008/0315817 A1* | 12/2008 | Yonemori | B60L 3/0061 | 318/476 |
| 2009/0071156 A1* | 3/2009 | Nishikawa | F01K 13/02 | 60/660 |
| 2009/0071428 A1* | 3/2009 | Kamiyama | F01P 11/20 | 123/142.5 R |
| 2009/0078400 A1* | 3/2009 | Tamura | B60H 1/00278 | 165/287 |
| 2009/0189617 A1* | 7/2009 | Burns | E21B 43/24 | 324/649 |
| 2009/0229288 A1* | 9/2009 | Alston | F25B 27/00 | 62/236 |
| 2010/0094493 A1* | 4/2010 | Atsumi | B60W 20/15 | 701/22 |
| 2010/0250038 A1* | 9/2010 | Morita | B60L 58/10 | 701/22 |
| 2011/0178665 A1* | 7/2011 | Yoshioka | B60W 30/194 | 701/22 |
| 2011/0178977 A1* | 7/2011 | Drees | G06Q 10/04 | 706/52 |
| 2011/0251746 A1* | 10/2011 | Wu | E02F 9/2075 | 701/22 |
| 2011/0276210 A1* | 11/2011 | Tanaka | F01P 3/20 | 701/22 |
| 2012/0024517 A1* | 2/2012 | Imanishi | B60H 1/32284 | 165/287 |
| 2012/0118248 A1* | 5/2012 | Mehring | F01P 3/02 | 123/41.08 |
| 2012/0174602 A1* | 7/2012 | Olivier | B60H 1/005 | 62/79 |
| 2012/0316712 A1* | 12/2012 | Simonini | B60L 58/24 | 701/22 |
| 2013/0111932 A1* | 5/2013 | Mishima | B60L 58/27 | 62/79 |
| 2013/0125853 A1* | 5/2013 | Pursifull | F01M 5/021 | 123/196 AB |
| 2013/0131919 A1* | 5/2013 | Pan | B60H 1/3208 | 701/36 |
| 2013/0164573 A1* | 6/2013 | Williams | H01M 10/615 | 429/50 |
| 2013/0249495 A1* | 9/2013 | Ang | H01M 10/443 | 320/134 |
| 2013/0291577 A1* | 11/2013 | Miyakoshi | B60H 1/00785 | 62/151 |
| 2013/0332016 A1* | 12/2013 | Suzuki | F02N 11/084 | 701/22 |
| 2014/0012447 A1* | 1/2014 | Gao | B60L 53/11 | 701/22 |
| 2014/0013726 A1* | 1/2014 | Yacoub | F01N 3/2066 | 60/274 |
| 2014/0026865 A1* | 1/2014 | Dudar | F02M 25/0818 | 123/518 |
| 2014/0174080 A1* | 6/2014 | Friesth | F01K 3/00 | 60/641.1 |
| 2014/0196485 A1* | 7/2014 | Lombardo | F25B 49/02 | 62/89 |
| 2014/0230463 A1* | 8/2014 | Ziehr | F25B 49/025 | 62/56 |
| 2014/0347017 A1* | 11/2014 | Sugano | B60L 53/122 | 320/137 |
| 2014/0374058 A1* | 12/2014 | Greiner | B60H 1/00492 | 165/52 |
| 2014/0374081 A1* | 12/2014 | Kakehashi | B60H 1/04 | 165/202 |
| 2015/0000327 A1* | 1/2015 | Kakehashi | F02M 26/28 | 62/434 |
| 2015/0089922 A1* | 4/2015 | Hussain | F01P 3/20 | 60/273 |
| 2015/0101789 A1* | 4/2015 | Enomoto | B60L 50/16 | 165/202 |
| 2015/0122203 A1* | 5/2015 | Ideshio | F02D 25/02 | 123/2 |
| 2015/0202986 A1* | 7/2015 | Hatakeyama | F25B 6/02 | 165/287 |
| 2015/0217623 A1* | 8/2015 | Hatakeyama | B60L 58/13 | 165/42 |
| 2015/0243109 A1* | 8/2015 | Tseng | G07C 5/0808 | 701/29.1 |
| 2015/0273976 A1* | 10/2015 | Enomoto | B60L 3/0061 | 165/202 |
| 2015/0298522 A1* | 10/2015 | Hirabayashi | B60H 1/00314 | 701/36 |
| 2015/0336570 A1* | 11/2015 | Sugimura | B60W 10/08 | 701/22 |
| 2016/0031289 A1* | 2/2016 | Murata | H01M 10/663 | 701/22 |
| 2016/0097336 A1* | 4/2016 | Lee | F01P 7/167 | 123/672 |
| 2016/0121735 A1* | 5/2016 | Sugano | B60L 53/305 | 320/109 |
| 2016/0153343 A1* | 6/2016 | Kakehashi | B60H 1/3228 | 123/41.31 |
| 2016/0215711 A1* | 7/2016 | Dudar | B60W 20/00 | |
| 2016/0318499 A1* | 11/2016 | Yamanaka | B60H 1/00899 | |
| 2016/0332505 A1* | 11/2016 | Yamanaka | B60H 1/00428 | |
| 2016/0339761 A1* | 11/2016 | Enomoto | B60H 1/00278 | |
| 2017/0008373 A1* | 1/2017 | Makihara | B60H 1/00828 | |
| 2017/0096136 A1* | 4/2017 | Nawata | B60W 10/06 | |
| 2017/0106724 A1* | 4/2017 | Porras | B60H 1/00385 | |
| 2017/0159545 A1* | 6/2017 | Onishi | B60H 1/32281 | |
| 2017/0210204 A1 | 7/2017 | Fuse et al. | | |
| 2017/0234246 A1* | 8/2017 | Dudar | B60W 20/40 | 701/22 |
| 2018/0050605 A1* | 2/2018 | Lewis | B60K 11/02 | |
| 2018/0058769 A1* | 3/2018 | Bidner | F28F 27/00 | |
| 2019/0041111 A1* | 2/2019 | Sun | F25B 49/027 | |

FOREIGN PATENT DOCUMENTS

| | | | | |
|---|---|---|---|---|
| JP | 2010023527 A | * | 2/2010 | B60L 1/02 |
| JP | 2011-121551 A | | 6/2011 | |
| JP | 2011-156982 A | | 8/2011 | |
| JP | 2012-005223 A | | 1/2012 | |
| JP | 2013-230805 A | | 11/2013 | |
| JP | 2015-154521 A | | 8/2015 | |
| JP | 2016-032348 A | | 3/2016 | |

* cited by examiner

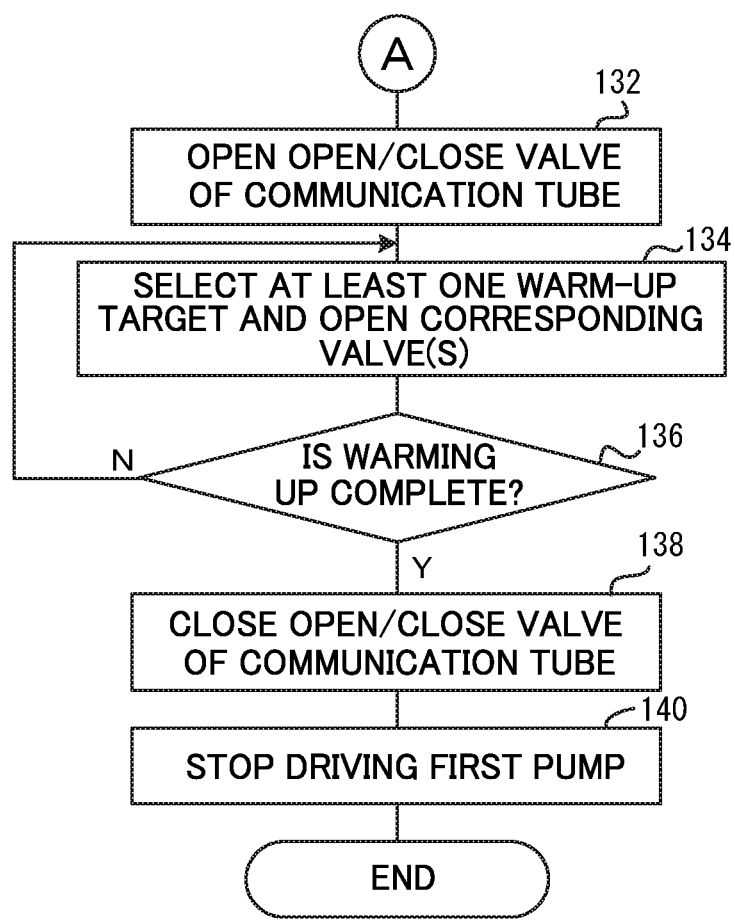

VEHICLE HEAT MANAGEMENT CONTROL DEVICE AND RECORDING MEDIUM STORING HEAT MANAGEMENT CONTROL PROGRAM

CROSS-REFERENCE TO RELATED APPLICATION

This application is based on and claims priority under 35 USC 119 from Japanese Patent Application No. 2017-023130 filed on Feb. 10, 2017, which is incorporated by reference herein.

BACKGROUND

Technical Field

The present disclosure relates to a vehicular heat management control device and a recording medium storing heat management control program for managing fluid heated by heat generated due to charging, in a vehicle in which some or all of the motive power source is configured by an electric motor.

Related Art

In a vehicle that uses an electric motor as a motive power source, a charger charges a storage battery with electrical power supplied from an external power source, and when traveling, the vehicle travels using electrical power from the storage battery to drive the electric motor.

For example, one classification refers to vehicles in which the motive power source is entirely from an electric motor as electric automobiles, and refers to vehicles in which the motive power source is partially from an electric motor, serving as the motive power source together with an internal combustion engine, as plug-in hybrid vehicles.

Note that for reference, there are also vehicles in which both an internal combustion and an electric motor are installed, the internal combustion engine is used as a generator, and only the electric motor serves as the motive power source.

However, when charging using the charger, heat may be generated in the charger and in a control device in the vicinity thereof.

Japanese Patent Application Laid-Open (JP-A) No. 2012-005223 describes heat generated during charging being supplied to a warm-up target. However, in JP-A No. 2012-005223, there is no mention of heat being supplied in so-called real time, the heat being stored, or a temperature being regulated according to the warm-up target.

JP-A No. 2011-121551 describes switching the supply of heat from a motor during vehicle travel or the like between a transmission, a battery, and a vehicle cabin. However, JP-A No. 2011-121551 does not consider shifting the time of heating by storing heat.

In contrast thereto, JP-A No. 2011-156982 describes utilizing heat generated during charging to warm up a vehicle cabin directly or through heat storage.

In JP-A No. 2011-156982, the technology envisaging heat storage in a vehicle includes a section that uses the temperature of the warm-up target (air in the vehicle cabin in JP-A No. 2011-156982) and the time to switch between heat storage and direct heat supply, and implements heat control with consideration given to the total amount of heat.

However, in the related heat management control, for example, atmosphere into which heat is discharged in JP-A No. 2011-156982 is merely accumulated in a duct (heat-source heat storage case), and even if heat insulation functionality is employed, it is difficult to maintain temperature for a long period of time.

SUMMARY

In one aspect of the present disclosure, a heat management control device for a vehicle includes an electric motor, a power supply section, a charging device, a heat exchanger, a heat storage section, and a fluid supply controller. The electric motor is applied as a motive power source. The power supply section includes a storage battery and is configured to supply electrical power to the electric motor. The charging device is configured to charge the storage battery through a connection to an external power source. The heat exchanger performs heat exchange of heat generated by the charging device during charging with fluid flowing in a specific transport path. The heat storage section uses a chemical reaction partway along the specific transport path to recover heat from the fluid and store the recovered heat. The fluid supply controller, from immediately after a vehicle is started, releases heat stored by the heat storage section to the fluid, and selectively supplies the fluid to predetermined plural warm-up targets.

BRIEF DESCRIPTION OF THE DRAWINGS

FIG. 8A to FIG. 8C are flowcharts illustrating a flow of warm-up control that occurs when charging begins according to an exemplary embodiment.

DETAILED DESCRIPTION

Figure 1A:
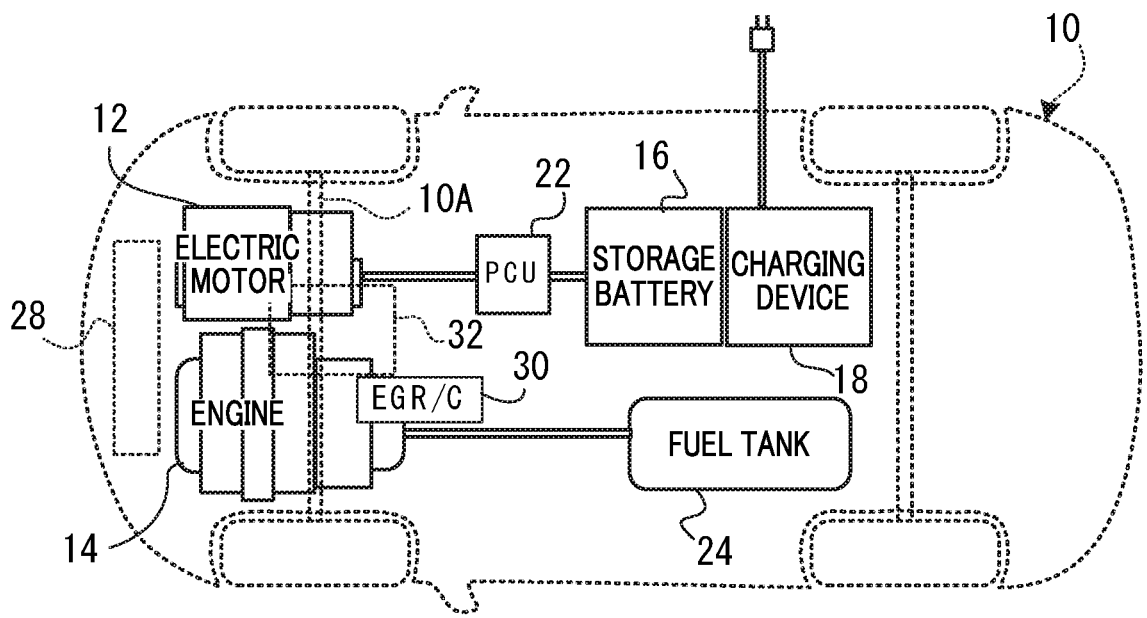
FIG. 1A and FIG. 1B are schematic diagrams of a vehicle according to an exemplary embodiment.
Figure 1B:
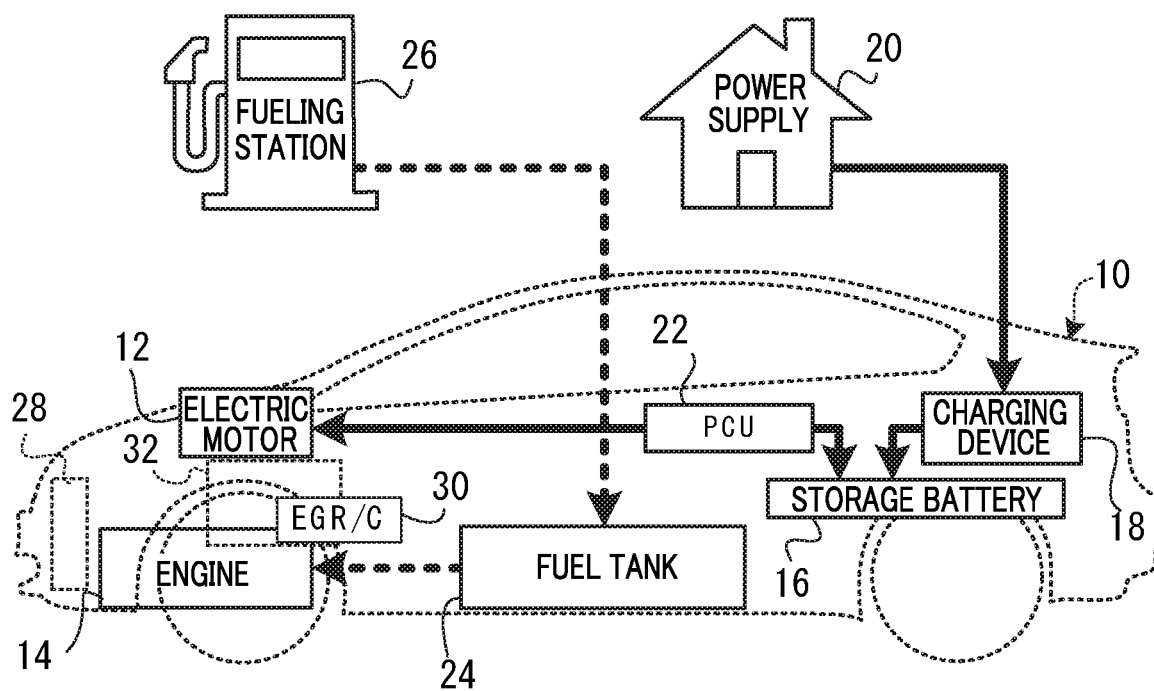

FIGS. 1A and 1B are schematic diagrams illustrating a vehicle 10 according to an exemplary embodiment. The vehicle 10 of the present exemplary embodiment functions as a plug-in hybrid vehicle.

For a motive power source, the vehicle 10 includes an electric motor 12 (referred to hereafter as "motor 12") and an internal combustion engine 14 (referred to hereafter as "engine 14").

The electric motor 12 is driven when supplied with power stored in a storage battery 16 mounted to the vehicle 10, and transmits drive force to a vehicle axle 10A through a drive force transmission system.

The vehicle 10 includes a charging device 18. The charging device 18 is a controlling device that charges the storage battery 16, and, for example, by connecting the charging device 18 to a household power outlet 20 (see FIG. 1B), the vehicle 10 takes in power and the charging device 18 charges the storage battery 16.

Power charged in the storage battery 16 is converted into drive power of the electric motor 12 by a power control unit 22 (referred to hereafter as "PCU 22").

Namely, the PCU 22 includes a step-up converter that steps up the voltage of the storage battery 16 to a maximum system voltage, and an inverter that converts DC voltage into AC voltage and that drives the electric motor 12, which acts as a motive power source.

Note that the storage battery 16 can be charged, for example, by receiving regenerated energy from the electric motor 12 when braking the vehicle 10, and can be charged by receiving generated energy from a generator (dynamo) that generates power as a result of driving the internal combustion engine 14.

Further, a fuel tank 24 of the vehicle 10 holds fuel from a fueling station 26 (see FIG. 1B). Fuel is supplied to the engine using a fuel injector, is mixed with air to a predetermined fuel-air ratio, and is combusted in a combustion chamber such that the reciprocating motion of a piston is converted into rotation motion, and drive force is transmitted to the vehicle axle through the drive force transmission system.

The vehicle 10 includes a radiator 28. The radiator 28 is a heat exchanger that releases heat from a coolant (for example, cooling water), and circulates the coolant through the sections of the internal combustion engine 14.

The internal combustion engine 14 also includes an exhaust gas recirculation system 30 (referred to hereafter as "EGR/C 30").

The vehicle 10 also includes a transaxle device 32 (referred to hereafter as "T/A 32"), serving as the drive force transmission system that transmits the motive power sourced from the electric motor 12 and the internal combustion engine 14 to the vehicle axle 10A. The T/A 32 includes a gear mechanism for drive force distribution.

The drive force distributing gear mechanism is formed by a planetary gearing mechanism, and switches between transmitting drive force from the internal combustion engine 14 to the vehicle axle 10A side, transmitting drive force from the electric motor 12 to the vehicle axle 10A side, and transmitting drive force from both the electric motor 12 and the internal combustion engine 14 to the vehicle axle 10A side.

In the exemplary embodiment of the present disclosure, the engine 14, the storage battery 16, the PCU 22, the radiator 28, the EGR/C 30, and the T/A 32 are all devices that may be selected as a target to be warmed up to improve operation efficiency of the drive system configured by the electric motor 12 and the engine 14 described above.

In the present exemplary embodiment, heat generated when charging the storage battery 16 is primarily used to selectively warm up the warm-up targets mentioned above.

Figure 2:
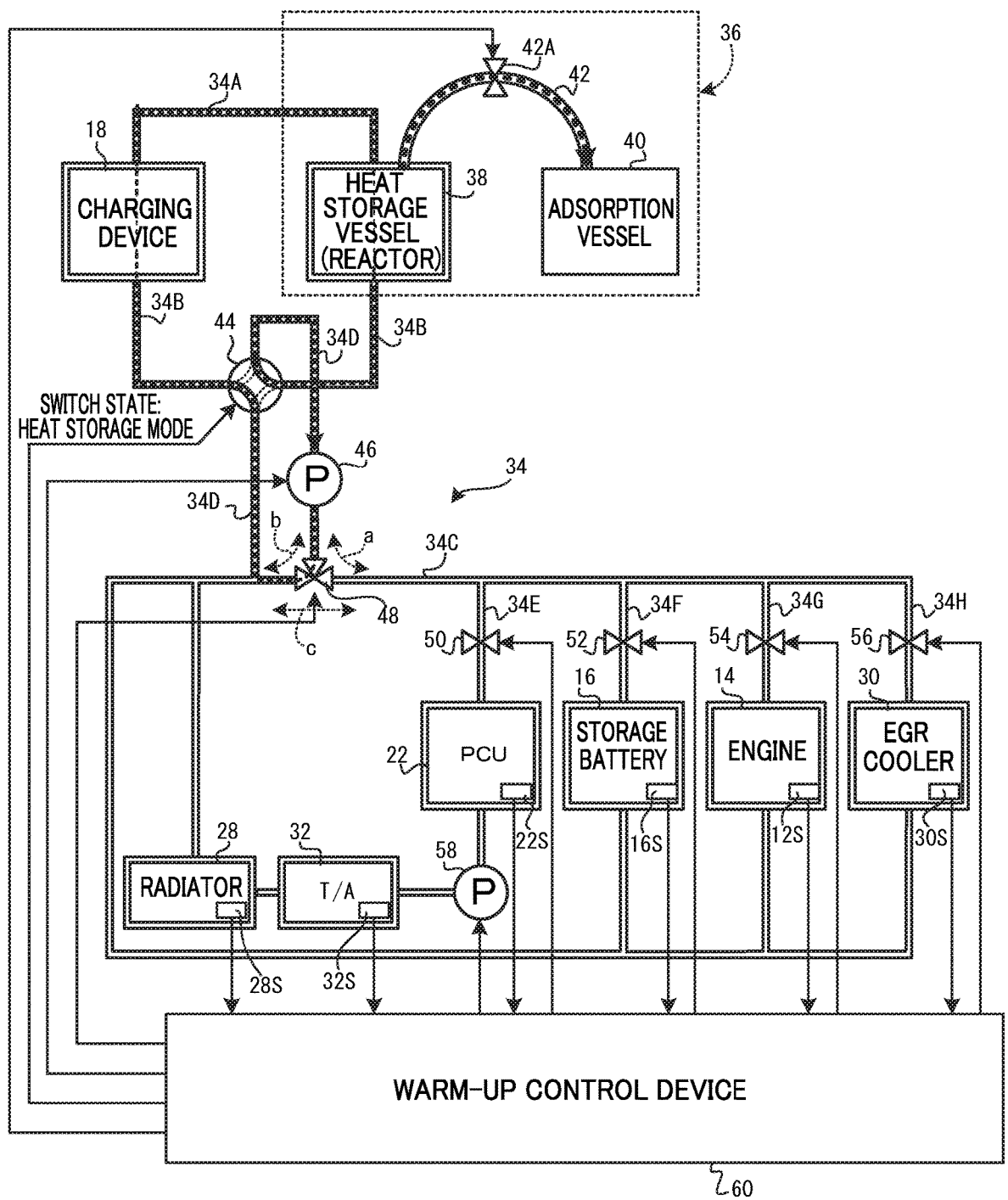
FIG. 2 is a schematic diagram of a warm-up system for warming up a warm-up target according to an exemplary embodiment, and illustrates a state in which fluid flows during heat storage.
Figure 3:
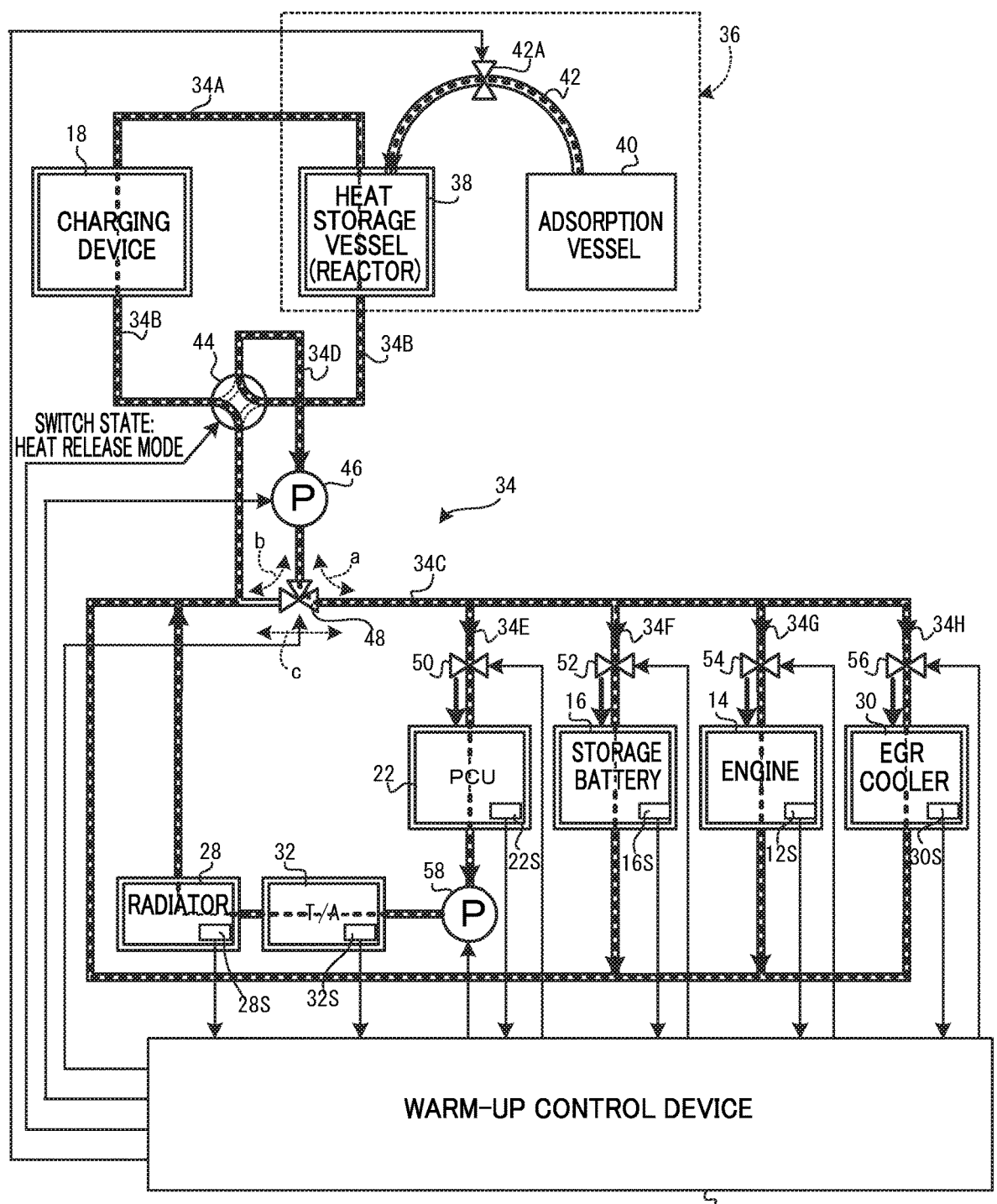
FIG. 3 is a schematic diagram of a warm-up system for warming up a warm-up target according to an exemplary embodiment, and illustrates a state in which fluid flows toward a warm-up target.

FIG. 2 and FIG. 3 are schematic diagrams of a warm-up system that is provided to warm up a warm-up target. The warm-up system is for controlling a pipeline for fluid circulating around the warm-up target devices and the like, and for controlling heat storage using the fluid flowing in the pipeline, the selection of the warm-up target, and the amount of fluid flow. Note that although described in detail later, FIG. 2 illustrates a state in which fluid flows during heat storage, FIG. 3 illustrates a state in which fluid is flowing toward the warm-up target, and FIG. 4 illustrates a state in which fluid flows at a stage in which heat storage has completed yet charging has not completed when heat generated by the charging device 18 is supplied directly to the warm-up target.

In the warm-up system of the present exemplary embodiment, the main source of generated heat is the charging device 18, and generated heat is configured so as to be stored in a chemical heat storage reactor 36.

Details Regarding Chemical Heat Storage Reactor 36

Figure 4:
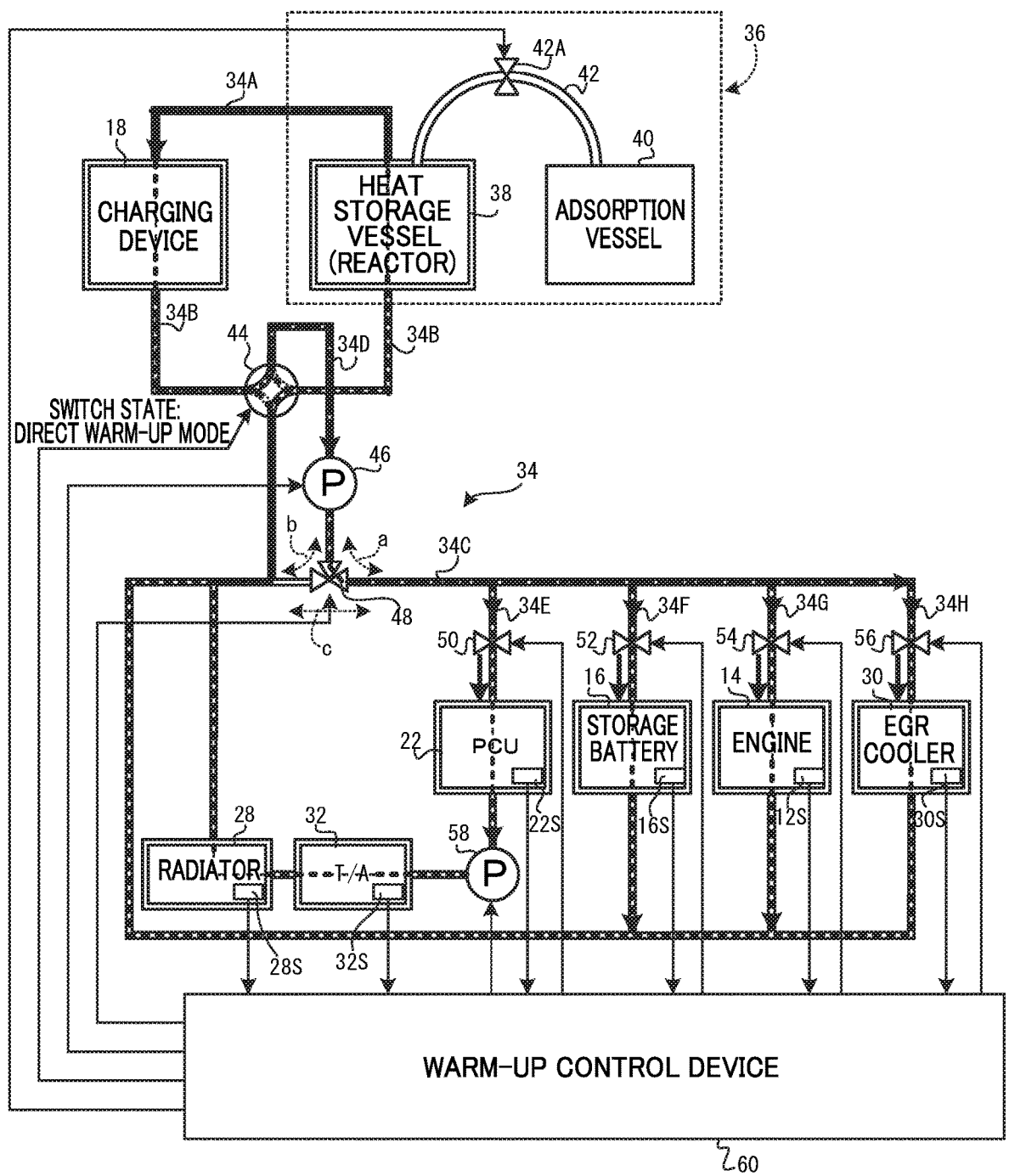
FIG. 4 is a schematic diagram of a warm-up system for warming up a warm-up target according to an exemplary embodiment, and illustrates a state in which fluid flows directly from a charging device to a warm-up target.

As illustrated in FIG. 4, the chemical heat storage reactor 36 recovers heat from the fluid flowing in the pipeline (first pipe 34A, described later), and includes a heat storage vessel 38 that uses the chemical heat storage reactor 36 to store heat, and an adsorption vessel 40 that adsorbs and retains cooling medium which is used in a chemical reaction in the heat storage vessel 38.

Heat storage methods include sensible heat storage, in which a temperature change in a material is used, latent heat storage in which a phase change in a material is used, and so on; however, in such methods, a large amount of energy is lost due to heat release when the heat storage duration is long, and so in the present exemplary embodiment, chemical heat storage is chosen. Chemical heat storage has the advantage in that the amount of heat stored per unit volume is large, and heat can be stored over a long period of time.

A compound primarily consisting of chlorine and at least one out of the alkali metals, the alkaline earth metals, or the transition metals is suitable as the heat storage agent. Alkali metals include lithium (Li), sodium (Na), potassium (K), rubidium (Rb), cesium (Cs), and francium (Fr). Metal chlorides thereof (alkali metal chlorides) include LiCl, NaCl, Kcl. Further, alkaline earth metals include beryllium (Be), magnesium (Mg), calcium (Ca), strontium (Sr), barium (Ba), and radium (Ra). Metal chlorides thereof (alkaline earth metal chlorides) include $MgCl_2$, $CaCl_2$, and $SrCl_2$. Among these, calcium chloride ($CaCl_2$) and strontium chloride ($SrCl_2$) are more preferable. Although there are many types of transition metals, examples of transition metal chlorides suitable for heat storage include $MnCl_2$, $FeCl_2$, $CoCl_2$, and $NiCl_2$.

Activated carbon or the like capable of adsorbing the cooling medium is preferably employed as the adsorption material. The adsorption vessel 40 is configured such that the adsorption material is housed in a casing. Note that in the present exemplary embodiment, ammonia ($NH_3$), which as a cooling medium is capable of being transported at a high vapor pressure even at or below its freezing point, is employed.

The heat storage vessel 38 and the adsorption vessel 40 are in communication via a communication pipe 42, such that ammonia serving as the cooling medium, for example, is capable of going back and forth therebetween. An open/close valve 42A is attached to the communication tube 42, and when the open/close valve 42A is in an open state, the direction of flow of the ammonia changes as a result of the pressure difference between the heat storage vessel 38 and the adsorption vessel 40.

Figure 5A:
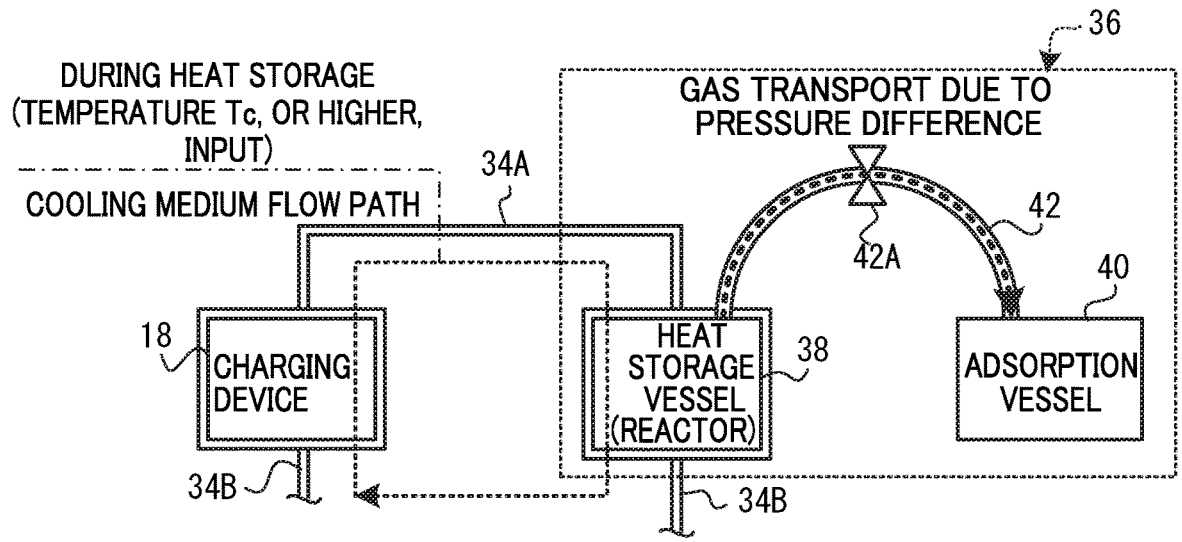
FIG. 5A is a schematic diagram illustrating a state in which heat is stored by a chemical heat storage reactor according to an exemplary embodiment.
Figure 5B:
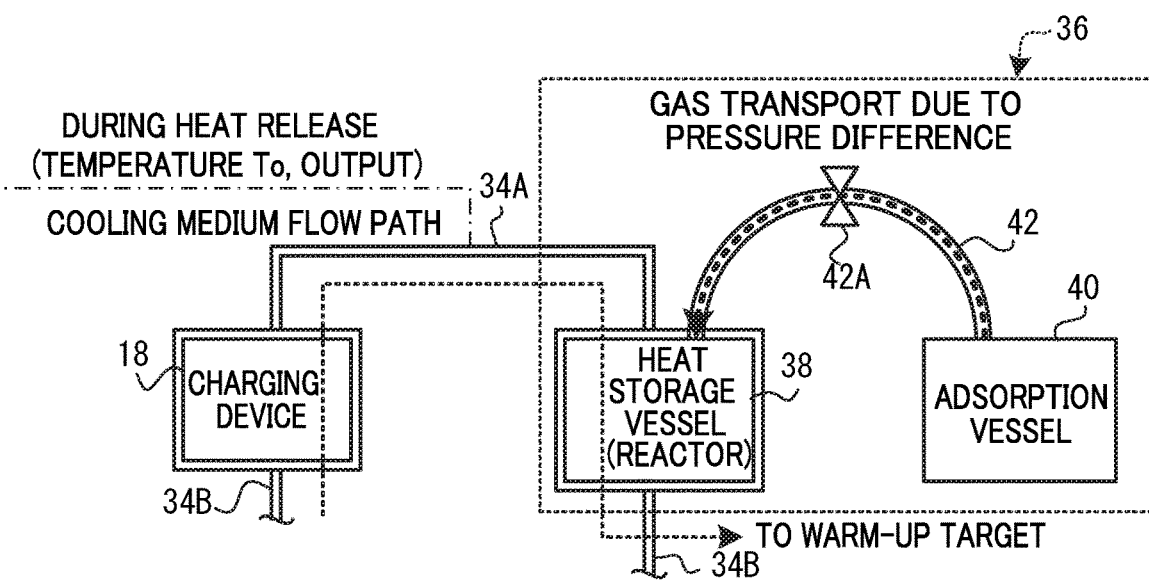
FIG. 5B is a schematic diagram illustrating a state in which heat is released by a chemical heat storage reactor according to an exemplary embodiment.
Figure 5C:
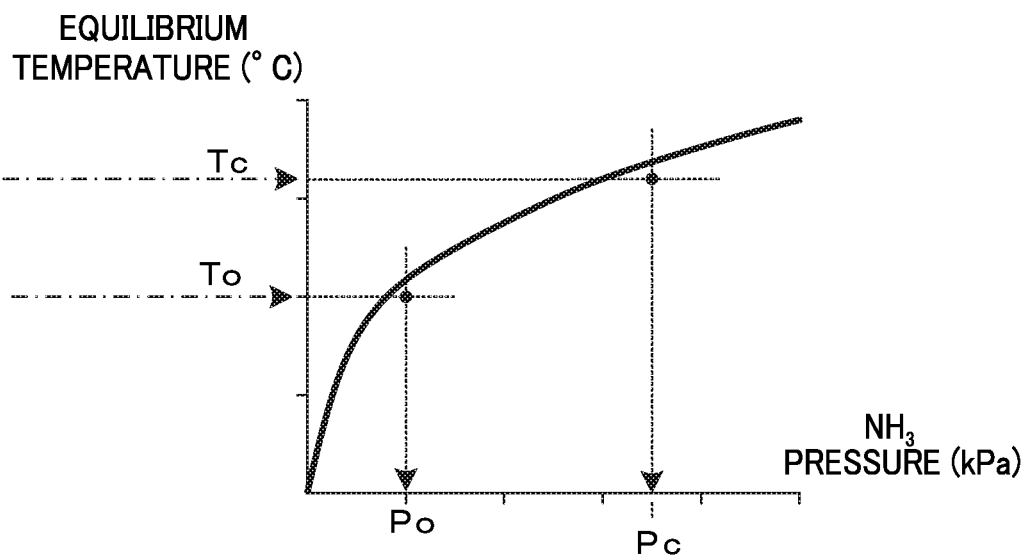
FIG. 5C is a pressure-equilibrium temperature characteristics diagram for a chemical heat storage reactor according to an exemplary embodiment.
Figure 5D:
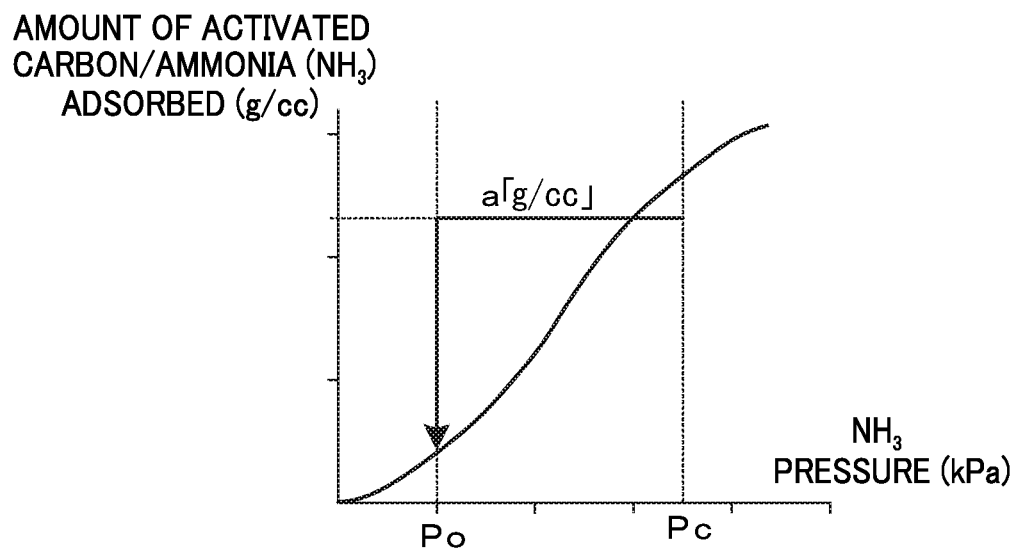
FIG. 5D is a pressure-adsorption amount characteristics diagram for the chemical heat storage reactor.

During heat storage as in FIG. 5A, in a state in which heat from the fluid flowing in a first pipe 34A, this being part of pipeline 34, is being stored in the heat storage vessel 38 at a temperature Tc (>To) or higher, the pressure in the heat storage vessel 38 becomes the vapor pressure of ammonia Pc at temperature Tc (see FIG. 5C, Pc>Po), and the amount of activated carbon/ammonia ($NH_3$) adsorbed in the heat storage vessel 38 is 0.236 g/cc or more (see FIG. 5D). Ammonia thus moves from the heat storage vessel 38 toward the adsorption vessel 40 as a result of the pressure difference.

When movement of the ammonia has ended, the open/close valve 42A adopts a closed state, such that the adsorption vessel 40 is maintained in the heat storage state in which the pressure in the adsorption vessel 40 is in a high state.

On the other hand, the open/close valve 42A of the communication tube 42 opens when heat is released from the chemical heat storage reactor 36 into the fluid flowing in the pipeline 34. Accordingly, due to the pressure difference, ammonia moves from the adsorption vessel 40 toward the heat storage vessel 38, heat is released from the heat storage vessel 38, heat exchange is performed with the fluid, and the fluid is guided toward the warm-up target. The determination as to whether heat storage is complete is determined using a pressure sensor installed to the chemical heat storage reactor 36.

As illustrated in FIG. 2, FIG. 3, and FIG. 4, the first pipe 34A and a second pipe 34B are provided between the charging device 18 and the heat storage vessel 38 of the chemical heat storage reactor 36.

A first four-way valve 44 is placed along the second pipe 34B. The first four-way valve 44 includes four ports. Two of the ports among these four ports communicate with the charging device 18 and the heat storage vessel 38 through the second pipe 34B.

The remaining two ports among the ports of the first four-way valve 44 communicate with a circulation pipe 34C through a third pipe 34D.

A first pump 46 and a three-way valve 48 are placed along one pipe (the third pipe 34D) that communicates between the circulation pipe 34C and the first four-way valve 44.

The first pump 46 sends fluid flowing in the second pipe 34B toward the circulation pipe 34C at a predetermined rate of flow.

The three-way valve 48 selectively places three paths in communication with each other (see the arrow a, arrow b, and arrow c in FIG. 2, FIG. 3, and FIG. 4).

In the circulation pipe 34C, a circulation path is formed for fluid to be sent to and taken in by the warm-up targets. In the present exemplary embodiment, the circulation pipe 34C is formed with pipes 34E, 34F, 34G and 34H through which fluid is separately sent to respective warm-up targets, and a valve (first valve 50, second valve 52, third valve 54, and fourth valve 56) is respectively attached to each pipe.

In the present exemplary embodiment, fluid is sent toward the PCU 22 when the first valve 50 is open. Note that a second pump 58 is provided downstream of the PCU 22, and is configured such that fluid sent to the PCU 22 is sent toward the T/A 32 and the radiator 28.

Further, fluid is sent toward the storage battery 16 when the second valve 52 is open, fluid is sent toward the engine 14 when the third valve 54 is open, and fluid is sent toward the EGR/C 30 when the fourth valve 56 is open.

Note that the warm-up system according to the present exemplary embodiment includes a warm-up control device 60.

Figure 6:
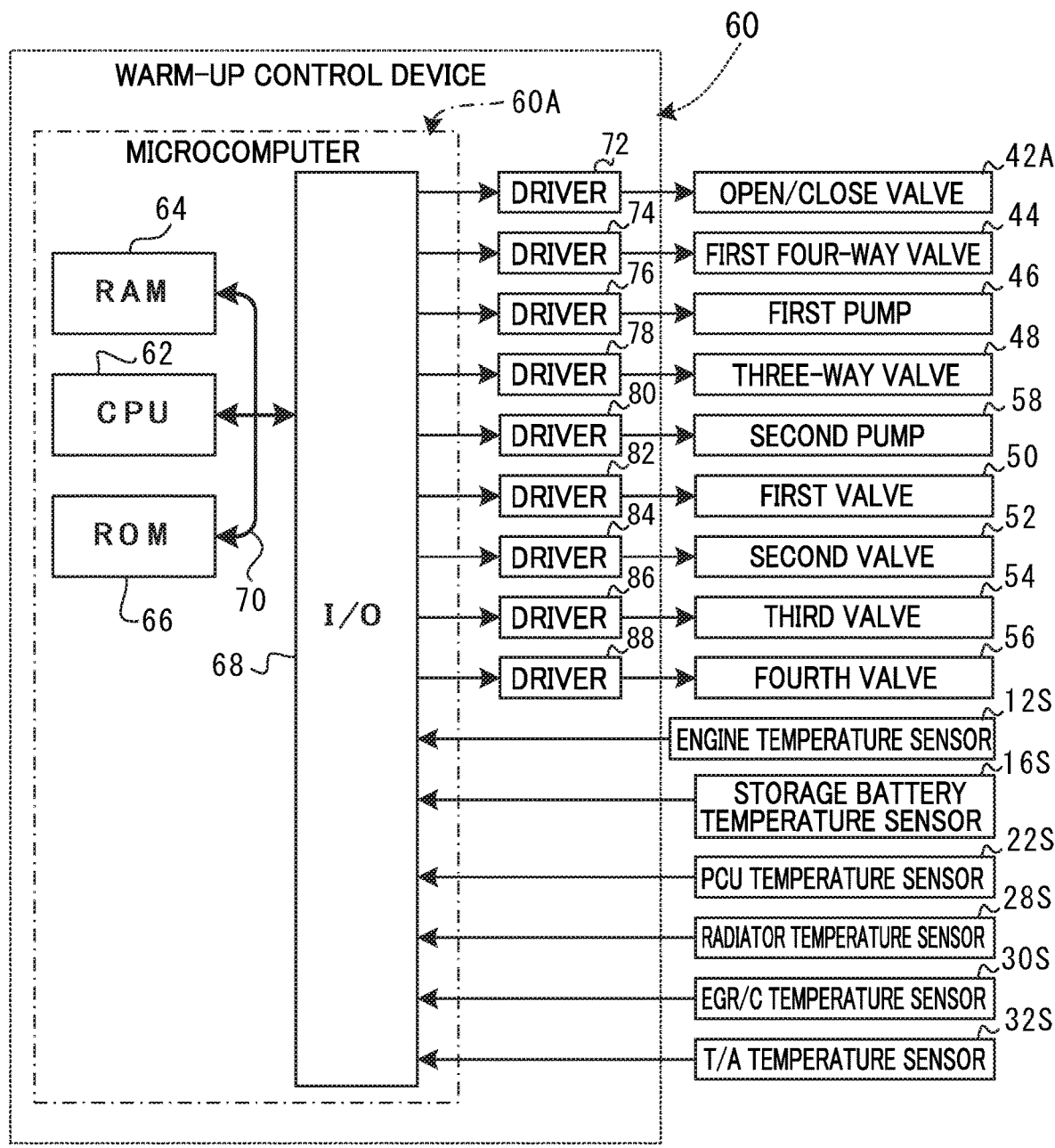
FIG. 6 is a block diagram of control of a warm-up control device according to an exemplary embodiment.

As illustrated in FIG. 6, the warm-up control device 60 includes a microcomputer 60A configured by a CPU 62, RAM 64, ROM 66, and an input/output port (I/O) 68 that are connected together by a bus 70 such as a data bus or a control bus.

The following are connected to the I/O 68 as output devices: the open/close valve 42A of the chemical heat storage reactor 36 through a driver 72, the first four-way valve 44 through a driver 74, the first pump 46 through a driver 76, the three-way valve 48 through a driver 78, the second pump 58 through a driver 80, the first valve 50 through a driver 82, the second valve 52 through a driver 84, the third valve 54 through a driver 86, and the fourth valve 56 through a driver 88.

Each of the following devices is attached to the I/O 68 as an input device: the engine 14, the storage battery 16, the PCU 22, the radiator 28, the EGR/C 30, and the T/A 32, these being warm-up targets. Moreover, temperature sensors for detecting the respective temperature of these devices (an engine temperature sensor 12S, a storage battery temperature sensor 16S, a PCU temperature sensor 22S, a radiator temperature sensor 28S, an EGR/C temperature sensor 30S, and a T/A temperature sensor 32S) are also connected to the I/O 68.

As illustrated in FIG. 2, FIG. 3, and FIG. 4, the first pump 46 (including the second pump 58) controls the flow rate of fluid flowing in the pipeline 34. Flow rate control may employ a section that regulates temperature when storing heat generated by the charging device 18 during charging in the heat storage vessel 38, and a section that regulates temperature when warming up a warm-up target.

Particularly, in the present exemplary embodiment, the heat generated by the charging device 18 is sometimes of an insufficient temperature to warm up the warm-up target, and so fluid is preferably sent to the heat storage vessel 38 regulated in temperature by controlling the flow rate.

Flow Rate Regulation

It will be demonstrated below that it is possible to regulate the temperature by regulating the fluid flow rate when heat generated by the charging device 18 during charging is being stored in the heat storage vessel 38, and to regulate the temperature when the warm-up target is being warmed up.

Figure 7:
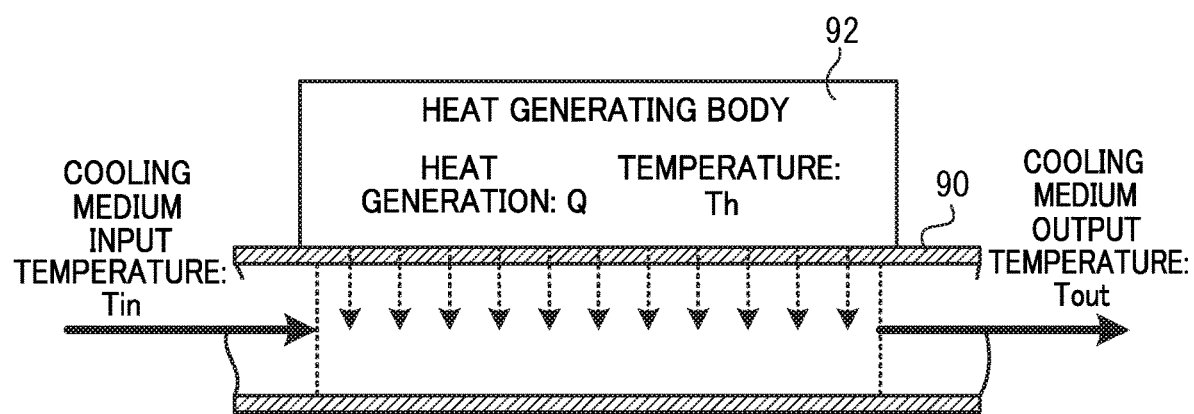
FIG. 7 is a schematic diagram explaining the principles of temperature regulation according to flow rate control.

As illustrated in FIG. 7, in a pipe 90, for example, when the temperature of fluid upstream of a heat generating body 92 is denoted as Tin and the temperature of fluid downstream of the heat generating body 92 is denoted as Tout, the following relationship between Tin and Tout holds.

$$Q = \alpha A \times (Th - Tin) = \rho \times CL \times V \times (Tout - Tin) \quad (1)$$

Q is the Q value (heat loss coefficient) of the heat generating body of heat stored in the chemical heat storage reactor 36 (see FIG. 2, FIG. 3, and FIG. 4), Th is the temperature of the heat generating body of heat stored in the chemical heat storage reactor 36, a is the heat transfer ratio, A is the surface area of heat transfer, ρ is the density of the fluid (cooling medium), CL is the heat ratio of the fluid (cooling medium), and V is the flow rate of the fluid (cooling medium).

The fluid flow rate can be controlled, for example, by regulating the first pump 46 and the like.

Further, the Q value is determined by measuring Tin and Tout.

Th can also be measured, enabling α to be found.

When the state described above is secured, Tout can be controlled by changing the flow rate V.

α is generally a function of the flow rate V, and Th can be controlled by changing V.

The warm-up control device 60 of the present exemplary embodiment performs the following control.

In first control, when charging of the storage battery 16 begins, in cases in which a detection temperature detected by the storage battery temperature sensor S16S of the storage battery 16 is less than or equal to a preset threshold value, the second valve 52 is opened and fluid heated by the charging device 18 is sent to the storage battery 16 (charging performance improvement control).

In second control, when charging of the storage battery 16 begins, in cases in which a detection temperature detected by the storage battery temperature sensor S16S of the storage battery 16 exceeds the preset threshold value, the chemical heat storage reactor 36 performs chemical heat storage (heat storage retention control).

In third control, a fluid flow path is decided based on respective temperatures detected from the warm-up targets, and the heat stored in the chemical heat storage reactor 36 selectively warms up a warm-up target (warm-up control).

Figure 8A:
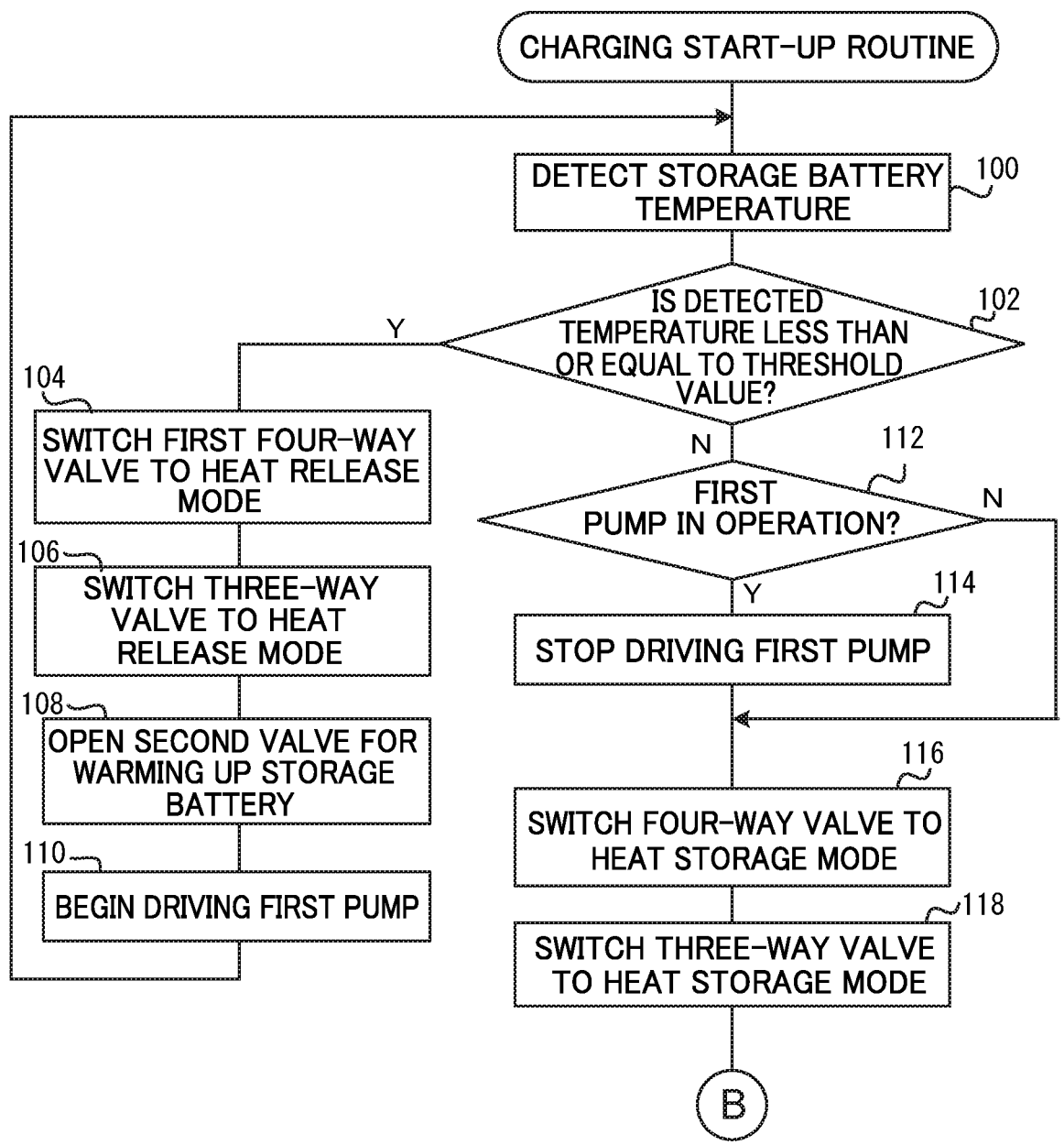
Figure 8B:
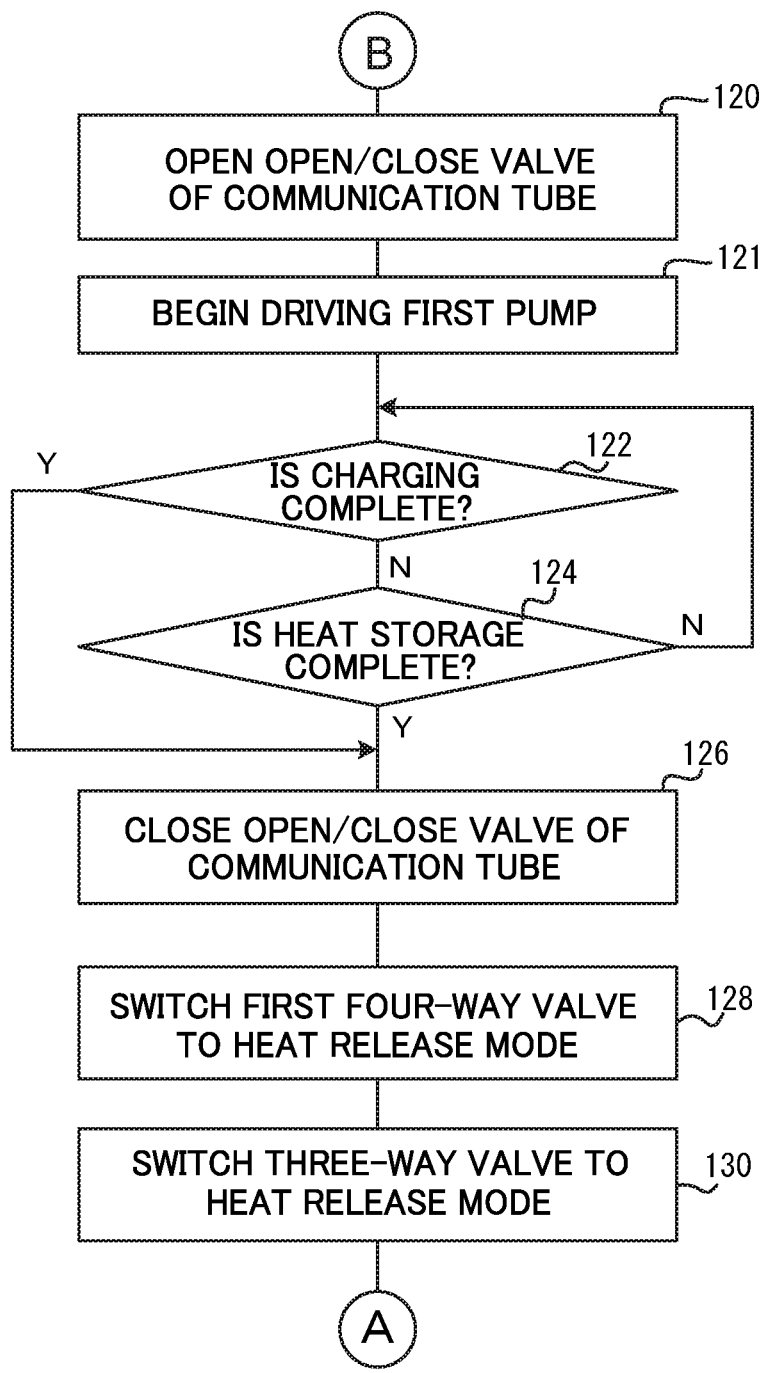

Explanation follows regarding operation of the present exemplary embodiment, with reference to the flowchart in FIG. 8A to FIG. 8C.

FIG. 8A to FIG. 8C are flowcharts illustrating the flow of warm-up control that occurs when charging begins.

At step 100, the temperature of the storage battery 16 is detected by the storage battery temperature sensor 16S. Next, processing transitions to step 102, and whether or not the detected temperature of the storage battery 16 is less than or equal to a predetermined threshold value is determined. The threshold value is, for example, a temperature at which charging performance of the storage battery 16 is determined to be poor. When below or at this temperature, the time it takes to charge might cause inconvenience.

In cases in which determination at step 102 is affirmative, namely, in cases in which the detected temperature of the storage battery 16 is less than or equal to the threshold value, processing transitions to step 104, and the first four-way valve 44 is switched to the heat release mode side (see the state in FIG. 3). Next, processing transitions to step 106 and the three-way valve 48 is switched to heat release mode (see arrow a in FIG. 3), and processing transitions to step 108.

At step 108, the second valve 52 for warming up the storage battery is opened, and processing transitions to step 110. At step 110, driving of the first pump 46 begins, and processing returns to step 100.

Note that FIG. 3 illustrates a state in which the first valve 50, the second valve 52, the third valve 54, and the fourth valve 56 are all open; however, at step 108 described above, of the first valve 50, the second valve 52, the third valve 54, and the fourth valve 56, only the second valve 52 is open.

This enables the heat of the charging device 18, which generates heat during charging, to be supplied through the fluid to the storage battery 16 in real time, and the temperature of the storage battery 16 can be quickly raised to a temperature exceeding the threshold value.

In cases in which determination at step 102 is negative, namely, in cases in which the detected temperature of the storage battery 16 exceeds (or has exceeded) the threshold value when charging begins or as the fluid raises the temperature of the storage battery 16, the temperature of the storage battery 16 is an appropriate temperature, and processing transitions to step 112.

At step 112, determination is made as to whether or not the first pump 46 is operating. In cases in which determination at step 112 is affirmative, the temperature of the storage battery 16 has been raised, and so processing transitions to step 114, driving of the first pump 46 is stopped, and processing transitions to step 116. In cases in which determination is negative at step 112, processing transitions to step 116.

At step 116, the first four-way valve 44 is switched to the heat storage mode side (see the state in FIG. 2). Next, processing transitions to step 118 and the three-way valve 48 is switched to heat storage mode (see arrow b in FIG. 2), and processing transitions to step 120.

At step 120, the open/close valve 42A of the communication tube 42 of the chemical heat storage reactor 36 opens. Next, processing transitions to step 121, driving of the first pump 46 begins, and processing transitions to step 122.

Due to driving the first pump 46, the fluid flows as indicated by the bold, dotted arrows indicated along the pipelines in FIG. 2.

When this is performed, the heat storage vessel 38 of the chemical heat storage reactor 36 receives heat from the fluid, and due to the pressure difference, ammonia released from the heat storage vessel 38 by this heat moves toward the adsorption vessel 40 through the communication tube 42 with the open open/close valve 42A, and is adsorbed in the adsorption vessel 40.

Herein, the fluid flow rate can be regulated by controlling driving of the first pump 46. Namely, sometimes the heat generated by the charging device 18 is of an insufficient temperature to store heat in the chemical heat storage reactor 36. Regulating the temperature of the fluid using flow rate control and sending the fluid to the heat storage vessel 38 thus enables heat to be stored using the chemical heat storage reactor 36. Specifically, the fluid flow rate V is computed according to Equation 1 and driving of the first pump 46 is controlled such that the fluid flow rate becomes the computed fluid flow rate V so as to cause the temperature Tout of the fluid downstream of the heat generating body 92 to reach a temperature greater than or equal to a predetermined temperature necessary for heat from the fluid to be stored in the chemical heat storage reactor 36 (for example, a temperature needed for the heat storage vessel 38 to release ammonia).

At step 122, determination is made as to whether or not charging has completed. In cases in which determination is negative, processing transitions to step 124, and determination is made as to whether or not heat storage using the chemical heat storage reactor 36 has completed. In cases in which determination is negative at step 124, processing returns to step 122.

In cases in which determine is affirmative at either step 122 or step 124, processing transitions to step 126.

At step 126, the open/close valve 42A of the communication tube 42 of the chemical heat storage reactor 36 is closed, and processing transitions to step 128.

At step 128, the first four-way valve 44 is switched to the heat release mode side (see the state in FIG. 3). Next, processing transitions to step 130, the three-way valve 48 is switched to heat release mode (see arrow a in FIG. 3), and processing transitions to step 132.

At step 132, the open/close valve 42A of the communication tube 42 of the chemical heat storage reactor 36 is opened. Fluid thereby flows toward the warm-up target, and warm up is performed.

At the next step 134, at least one warm-up target is selected, and its corresponding valve is opened. Fluid flows as indicated by the bold, dotted arrows indicated along the pipelines in FIG. 3.

Note that FIG. 3 illustrates a state in which the first valve 50, the second valve 52, the third valve 54, and the fourth valve 56 are all open; however, at step 132, of the first valve 50, the second valve 52, the third valve 54, and the fourth valve 56, only the valve(s) selected are opened.

Note that a selection standard is preferably selected based on the temperatures detected by the temperature sensors provided to each of the warm-up targets (the engine temperature sensor 12S, the storage battery temperature sensor 16S, the PCU temperature sensor 22S, the radiator temperature sensor 28S, the EGR/C temperature sensor 30S, and the T/A temperature sensor 32S).

Each warm-up target has its own particular suited temperature, and any warm-up target is warmed up by selecting a warm-up target having a detected temperature that is off from its suited temperature and supplying fluid to the warm-up target. Note that when the temperature of the respective warm-up target is detected as having reached its suited temperature, it is preferable each valve be closed individually. Note that the warm-up targets may be selected in a predetermined order of priority.

At the next step 136, determination is made as to whether or not warming up of every warm-up target has completed, and in cases in which determination is negative, processing returns to step 134. In cases in which determination at step 136 is affirmative, the open/close valve 42A of the communication tube 42 of the chemical heat storage reactor 36 is closed at step 138. Next, processing transitions to step 140, driving of the first pump 46 is stopped, and the routine is ended.

Although omitted from illustration in the flowcharts of FIG. 8A to FIG. 8C, as illustrated in FIG. 4, the first four-way valve 44 switches between the different states of the heat storage mode and the heat release mode and the three-way valve 48 controls the opening state of arrow a in FIG. 4, thereby enabling a direct warm-up mode to be established.

Moreover, in the present exemplary embodiment, in cases in which a four-way valve (the first four-way valve 44 in particular) changes the flow, and supplies heat from the charging device 18 to a warm-up target in particular, since heat capacity and heat are lost in the heat storage vessel 38 when the fluid flows along the path "charging device 18→heat storage vessel 38→warm-up target", warm up efficiency can be improved by switching the first four-way valve 44 such that fluid flows along the path "charging device 18→warm-up target" to supply heat directly (see the direct warm-up mode in FIG. 4).

As explained above, in the present exemplary embodiment, during charging, basically, heat generated when charging is able to be stored by the chemical heat storage reactor 36. Fluid can be sent to the necessary warm-up target, thereby warming up the warm-up target after charging has finished (for example, during warm up).

On the other hand, when the temperature of the storage battery 16 is low charging performance may be hampered, and so heat generated during charging is supplied in real time through the fluid so as to enable charging without decreasing charging performance.

Modified Example

Note that in the present exemplary embodiment, as illustrated in FIG. 2, FIG. 3, and FIG. 4, the engine 14 and the EGR/C 30 are each separate warm-up targets; however, the engine 14 and the EGR/C 30 are also configuration elements of an engine cooling system, and have an interrelationship with each other. Thus, as a modified example of the present exemplary embodiment, FIG. 9 illustrates both functionality for configuration elements of an engine cooling system and functionality for a warm-up target of the present disclosure.

Figure 9A:
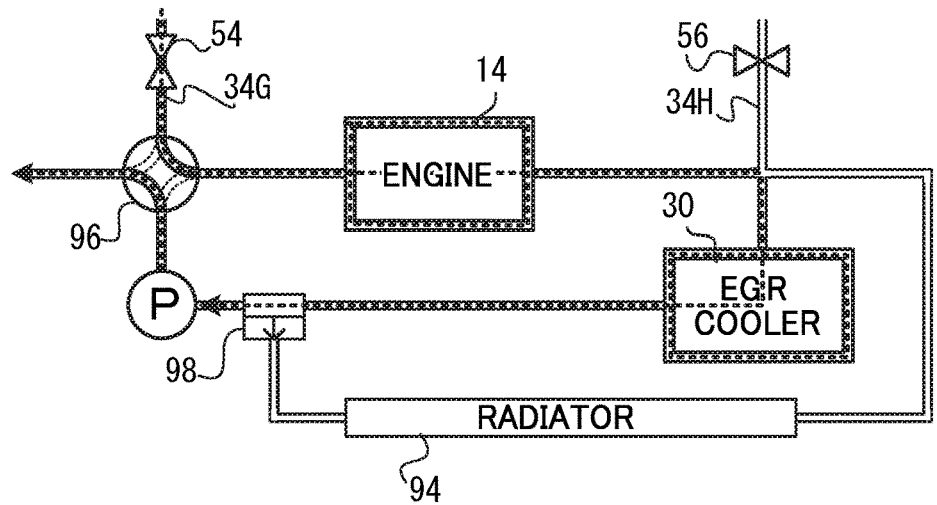
FIG. 9A to FIG. 9C are configurations according to a modified example of an exemplary embodiment having both functionality for configuration elements of an engine cooling system and functionality for a warm-up target of the present disclosure, and are schematic diagrams illustrating a valve state and circulation of fluid when (A) an engine is a warm-up target, (B) when an EGR/C 30 is the warm-up target, and (C) when functioning as a regular engine cooling system.
Figure 9B:
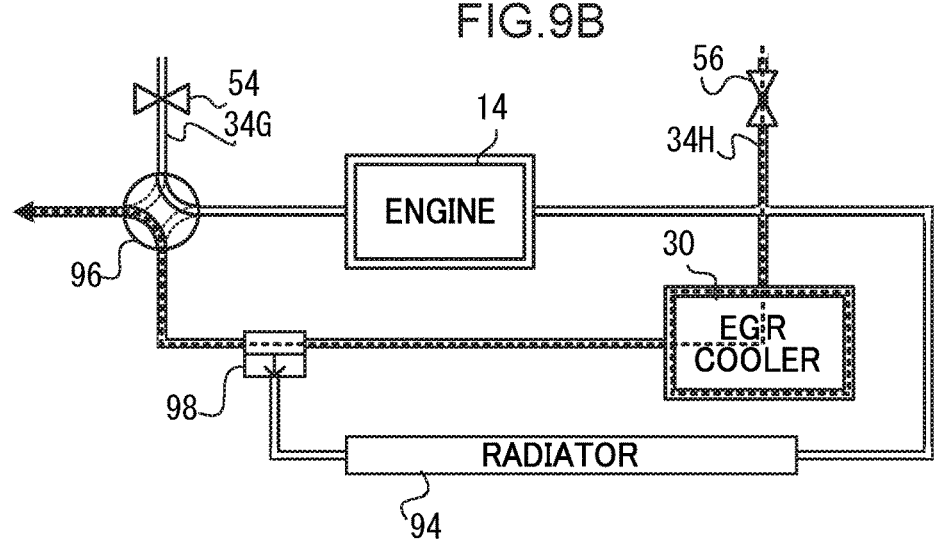
Figure 9C:
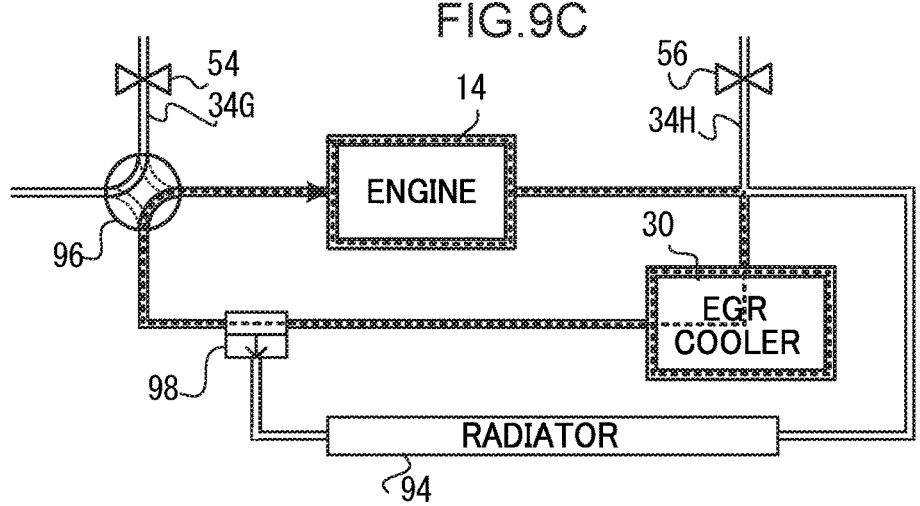

FIG. 9A is a diagram illustrating a valve state and circulation of fluid in cases in which the engine is a warm-up target, FIG. 9B is a diagram illustrating a valve state and circulation of fluid in cases in which the EGR/C 30 is the warm-up target, and FIG. 9C is a diagram illustrating a valve state and circulation of fluid when functioning as a regular engine cooling system.

Note that in the present exemplary embodiment, explanation has been given using an example in which the vehicle 10 is a plug-in hybrid vehicle. However, warm-up control according to the present exemplary embodiment may also be applied to an electric automobile not mounted with an internal combustion engine (an engine or the like) is or that is mounted with an internal combustion engine (engine or the like) that serves only as an emergency motive power source. For example, the EGR/C 30, the step-up converter, the drive force distributing gear mechanism (prioritizing gear mechanism), and the like mounted to the vehicle 10 of the present exemplary embodiment are not configuration necessary to the present disclosure.

In one aspect of the present disclosure, a heat management control device for a vehicle includes an electric motor, a power supply section, a charging device, a heat exchanger, a heat storage section, and a fluid supply controller. The electric motor is applied as a motive power source. The power supply section includes a storage battery and is configured to supply electrical power to the electric motor. The charging device is configured to charge the storage battery through a connection to an external power source. The heat exchanger performs heat exchange of heat generated by the charging device during charging with fluid flowing in a specific transport path. The heat storage section uses a chemical reaction partway along the specific transport path to recover heat from the fluid and store the recovered heat. The fluid supply controller, from immediately after a vehicle is started, releases heat stored by the heat storage section to the fluid, and selectively supplies the fluid to predetermined plural warm-up targets.

In this aspect of the present disclosure, the power supply section includes the storage battery, and is configured to supply electrical power to the electric motor. The storage battery is charged by the charging device, which is connected to an external power source.

Heat is generated by the charging device while charging using the charging device. The heat exchanger performs heat exchange of heat generated by the charging device during charging with fluid flowing through in the specific transport path. The heat storage section uses a chemical reaction partway along the specific transport path to recover heat from the fluid and store the recovered heat. During heat storage, an amount of fluid supplied to the charging device is regulated by the fluid supply controller, and the temperature of the fluid able to store heat is regulated.

In the fluid supply controller, from immediately after a vehicle is started, heat stored by the heat storage section is released into the fluid, and the fluid is selectively supplied to predetermined plural warm-up targets.

The present disclosure thus enables heat to be stored while suppressing the loss of heat generated due to charging, and enables the selective release of a necessary amount of heat, at the necessary time, to predetermined plural warm-up targets.

Another aspect of the present disclosure includes a regulating section that regulates a flow rate of the fluid when heat is recovered from the fluid by the heat storage section.

Regulating the flow rate of the fluid with the regulating section enables control to a temperature appropriate for the warm-up targets when heat is recovered from the fluid by the heat storage section.

In another aspect of the present disclosure, the warm-up targets include at least two or more out of transmission oil, air for supplying into a vehicle cabin, an EGR cooler, or a storage battery. A warm-up path is provided to each of the warm-up targets so as to perform circulation at the periphery of each warm-up target. The warm-up path is able to be placed in communication with, or to be closed off from, the specific transport path by switching a switching valve.

The warm-up targets include at least two or more out of transmission oil, air for supplying into a vehicle cabin, an EGR cooler, or a storage battery, and a warm-up path is provided to each of the warm-up targets so as to perform circulation at the periphery of each warm-up target. The warm-up path is able to be placed in communication with, or to be closed off from, the specific transport path by switching a switching valve. The fluid supply controller selectively supplies fluid to intended warm-up targets by control of the switching of the switching valves.

For example, if the switching valves are able to be independently controlled to as to open or close, it is possible to select one or plural of the warm-up targets.

In another aspect of the present disclosure, a temperature sensor is attached to each of the warm-up targets, and the fluid supply controller selects a warm-up target based on a detection result of the temperature sensors.

The temperature sensors are attached in order to determine the need, or lack thereof, of each warm-up target to be warmed up. The fluid supply controller is able to select warm-up targets based on the detection result of the temperature sensors.

In another aspect of the present disclosure, a temperature detected by the respective temperature sensor is compared to a preset vehicle fuel consumption improvement sensitivity map for each warm-up target to determine a priority order for warm-up targets.

A fuel consumption improvement sensitivity map is preset for each warm-up target for the same amount of input heat. A maximum fuel consumption improvement effect for equal amounts of heat can be expected due to using fuel consumption improvement sensitivity maps.

The fuel consumption improvement sensitivity map may be a theoretical characteristic curve, or may be an empirically learned characteristic curve.

In another aspect of the present disclosure, the warm-up targets include the storage battery, and the storage battery is configured as the highest priority warm-up target in cases in which the storage battery is at or below a preset warm-up target temperature.

In addition to loss generated in the charging device, loss during charging includes heat generated due to the internal resistance of the storage battery. Internal resistance of the storage battery decreases as the temperature of the storage battery rises. Thus, giving heat supply to the storage battery the highest priority enables charging efficiency to be improved.

In another aspect of the present disclosure, a heat management control program causes a computer to function as each section of a vehicular heat management control device.

The present disclosure as described above enables heat to be stored while suppressing the loss of heat generated due to charging, and enables the release of necessary amounts of heat at the necessary time.

What is claimed is:

1. A heat management control device for a vehicle, the heat management control device comprising: an electric motor configured to operate as a motive power source; a power supply section including a storage battery, the power supply section being configured to supply electrical power to the electric motor; a battery charger configured to charge the storage battery through a connection to an external power source; a heat exchanger configured to perform heat exchange of heat generated by the battery charger during charging with fluid flowing in a specific transport path; a chemical heat storage reactor configured to use a chemical reaction partway along the specific transport path in order to recover heat from the fluid and configured to store the recovered heat; a liquid pump configured to regulate a flow rate of the fluid along the specific transport path and regulate the flow rate of the fluid to a predetermined plurality of warm-up targets; and a warm-up control device configured to: determine a temperature of the storage battery during charging of the storage battery; in response to determining the temperature of the storage battery is greater than a predetermined temperature threshold value, control the specific transport path to perform heat exchange by the heat exchanger and store the recovered heat in the chemical heat storage reactor; and in response to determining the temperature of the storage battery is less than or equal to the predetermined temperature threshold value, from immediately after a vehicle is started, control the specific transport path to release the heat stored by the chemical heat storage reactor to the fluid, and selectively control the liquid pump to supply the fluid to the predetermined plurality of warm-up targets at the flow rate regulated by the liquid pump.

2. The vehicular heat management control device of claim 1, wherein:
   the plurality of warm-up targets include at least two or more of transmission oil, air for supplying into a vehicle cabin, an EGR cooler, or a storage battery; and
   a warm-up path is provided to each of the plurality of warm-up targets so as to perform circulation at a periphery of each of the plurality of warm-up targets, the warm-up path being able to be placed in communication with, or to be closed off from, the specific transport path by switching a switching valve.

3. The vehicular heat management control device of claim 1, wherein:
   a temperature sensor is attached to each of the plurality of warm-up targets; and
   the warm-up control device selects a warm-up target of the plurality of warm-up targets based on a detection result of the temperature sensors.

4. The vehicular heat management control device of claim 3, wherein a temperature detected by each respective temperature sensor is compared to a preset vehicle fuel consumption improvement sensitivity map for each warm-up target of the plurality of warm-up targets in order to determine a priority order for the plurality of warm-up targets.

5. The vehicular heat management control device of claim 1, wherein the plurality of warm-up targets include the storage battery, and the storage battery is configured as a highest priority warm-up target of the plurality of warm-up targets when the storage battery is at or below a preset warm-up target temperature.

6. A non-transitory computer readable recording medium storing a vehicular heat management control program that is executable by a computer in a vehicular heat management control device, the vehicular heat management control device including:

an electric motor configured to operate as a motive power source, a power supply section including a storage battery, the power supply section being configured to supply electrical power to the electric motor, a battery charger configured to charge the storage battery through a connection to an external power source, a heat exchanger configured to perform heat exchange of heat generated by the battery charger during charging with fluid flowing in a specific transport path, a chemical heat storage reactor configured to use a chemical reaction partway along the specific transport path in order to recover heat from the fluid and configured to store the recovered heat, and a liquid pump configured to regulate a flow rate of the fluid along the specific transport path and regulate the flow rate of the fluid to a predetermined plurality of warm-up targets, the vehicular heat management control program causing the computer to perform processing, the processing comprising: determining a temperature of the storage battery during charging of the storage battery; in response to determining the temperature of the storage battery is greater than a predetermined temperature threshold value, controlling the specific transport path to perform heat exchange by the heat exchanger and store the recovered heat in the chemical heat storage reactor; and in response to determining the temperature of the storage battery is less than or equal to the predetermined temperature threshold value, from immediately after a vehicle is started, controlling the specific transport path to release the heat stored by the chemical heat storage reactor to the fluid, and to selectively control the liquid pump to supply the fluid to the predetermined plurality of warm-up targets at the flow rate regulated by the liquid pump.

\* \* \* \* \*